United States Patent
Mori (10) Patent No.: US 8,970,911 B2
(45) Date of Patent: Mar. 3, 2015

(54) IMAGE PROCESSING APPARATUS

(71) Applicant: Seiko Epson Corporation, Tokyo (JP)

(72) Inventor: Shunichiro Mori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/094,138

(22) Filed: Dec. 2, 2013

(65) Prior Publication Data

US 2014/0160532 A1 Jun. 12, 2014

(30) Foreign Application Priority Data

Dec. 7, 2012 (JP) ................................. 2012-267979

(51) Int. Cl.
*H04N 1/405* (2006.01)
*H04N 1/50* (2006.01)

(52) U.S. Cl.
CPC ....................... *H04N 1/50* (2013.01)
USPC ........ 358/3.06; 358/3.14; 358/3.23; 358/1.16

(58) Field of Classification Search
USPC ................ 358/1.9, 2.1, 521, 3.01, 3.06–3.09, 358/3.14, 3.16, 3.21–3.24, 1.16
See application file for complete search history.

(56) References Cited

U.S. PATENT DOCUMENTS

| | | | | |
|---|---|---|---|---|
| 6,134,024 A | * | 10/2000 | Miura et al. | 358/1.9 |
| 6,519,056 B1 | | 2/2003 | Hattori | |
| 2014/0160532 A1 | * | 6/2014 | Mori | 358/3.06 |

FOREIGN PATENT DOCUMENTS

| | | |
|---|---|---|
| JP | 2002-369001 A | 12/2002 |
| JP | 2003-162717 A | 6/2003 |
| JP | 2008-205611 A | 9/2008 |

* cited by examiner

*Primary Examiner* — Thomas D Lee
*Assistant Examiner* — Stephen M Brinich
(74) *Attorney, Agent, or Firm* — Global IP Counselors, LLP (57) ABSTRACT

By using different conversion patterns from input gradation values to output gradation values for each coordinate inside a continuous region with a predetermined area, an image processing circuit is for halftoning which approximately expresses a number of gradations which is higher than the number of gradations which are output for each dot is optimized for each type of apparatus while being shared between types of devices where the number of gradations in the output gradation values is different. There is an image processing apparatus where the number of indexes is relatively high in a case which corresponds to a low gradation level which is a halftone level where the number of gradations in the corresponding output gradation values is relatively low.

4 Claims, 10 Drawing Sheets

| address | index | THRESHOLD FOR INPUT GRADATIONS |
|---|---|---|
| 0001 | 001 | 1/64 |
| | | 2/64 |
| | | 3/64 |
| | | 4/64 |
| 0002 | | 5/64 |
| | | 6/64 |
| | | 7/64 |
| | | 8/64 |
| 0003 | | 9/64 |
| | | 10/64 |
| | | 11/64 |
| | | 12/64 |
| - | | - |
| 0016 | | 61/64 |
| | | 62/64 |
| | | 63/64 |
| | | 64/64 |
| | - | |
| 2033 | 128 | 1/64 |
| - | | - |
| 2048 | | 61/64 |
| | | 62/64 |
| | | 63/64 |
| | | 64/64 |

Fig. 8

| address | index | THRESHOLD FOR INPUT GRADATIONS |
|---|---|---|
| 0001 | IMAGE 001 | 1/16 |
| | | 2/16 |
| | | 3/16 |
| | | 4/16 |
| 0002 | | 5/16 |
| | | 6/16 |
| | | 7/16 |
| | | 8/16 |
| 0003 | | 9/16 |
| | | 10/16 |
| | | 11/16 |
| | | 12/16 |
| 0004 | | 13/16 |
| | | 14/16 |
| | | 15/16 |
| | | 16/16 |
| - | - | - |
| 1021 | IMAGE 256 | 1/16 |
| | | 2/16 |
| | | 3/16 |
| | | 4/16 |
| - | | - |
| 1024 | | 13/16 |
| | | 14/16 |
| | | 15/16 |
| | | 16/16 |
| 1025 | TEXT 001 | 1/16 |
| | | 2/16 |
| | | 3/16 |
| | | 4/16 |
| - | - | - |
| 2045 | TEXT 256 | 1/16 |
| | | 2/16 |
| | | 3/16 |
| | | 4/16 |
| - | | - |
| 2048 | | 13/16 |
| | | 14/16 |
| | | 15/16 |
| | | 16/16 |

IMAGE PROCESSING APPARATUS

CROSS-REFERENCE TO RELATED APPLICATIONS

This application claims priority to Japanese Patent Application No. 2012-267979 filed on Dec. 7, 2012. The entire disclosure of Japanese Patent Application No. 2012-267979 is hereby incorporated herein by reference.

BACKGROUND

1. Technical Field

The present invention relates to an image processing apparatus, and in particular, to a halftoning technique.

2. Background Technology

Halftoning techniques are known in image processing apparatuses which are provided with a printing function such as printers, facsimiles, copiers, multifunctional printers, or the like. In halftoning, input gradation values are converted into output gradation values as a signal which controls the size of ink droplets or a signal which controls the pulse width of a laser which forms a latent image on a photosensitive body. Since the number of gradations in the output gradation values is lower than the number of gradations in the input gradation values, a number of gradations which is higher than the number of gradations in the output gradation values is approximately expressed by using a continuous region with a predetermined area. For example, it is possible to approximately express a number of gradations which is higher than the number of gradations which are output for each dot by using different conversion patterns from the input gradation values to the output gradation values for each of the coordinates inside the continuous region with the predetermined area as described in Patent Document 1 and Patent Document 2.

Japanese Laid-open Patent Publication No. 2002-369001 (Patent Document 1) and Japanese Laid-open Patent Publication No. 2003-162717 (Patent Document 2) are examples of the related art.

SUMMARY

Problems to Be Solved by the Invention

Here, a process which converts the input gradation values to the output gradation values is typically carried out using a high-speed integrated circuit such as a FPGA (Field-Programmable Gate Array) or an ASIC (Application Specific Integrated Circuit). In addition, the data table for converting the input gradation values to the output gradation values is retained in a memory which is able to be read out at high speed such as an SRAM. The number of gradations which is able to be expressed approximately increases along with increases in the types of conversion patterns, which are assigned to the area of the continuous region which is a processing unit at the time of expressing the gradation approximately and each of the pixels inside the continuous region, but the capacity of the data table for converting the input gradation values to the output gradation values also increases. In addition, there is a problem in that the development and manufacturing costs of the circuits increase when integrated circuits used in image processing for halftoning are prepared for each type of device in order to optimize halftoning specifications and memory sizes for each type of device.

One advantage of the invention is to optimize an integrated circuit used in image processing, which performs halftoning which approximately expresses a number of gradations which is higher than the number of gradations which are output for each dot by using different conversion patterns from the input gradation values to the output gradation values for each of the coordinates inside the continuous region with the predetermined area, for each type of apparatus while the integrated circuit is shared between types of devices where the number of gradations in the output gradation values are different.

Means Used to Solve the Above-Mentioned Problems (1) An image processing apparatus for achieving the advantage described above is provided with a first storage means (unit) which holds indexes, which indicate gradation conversion patterns which correspond to each of the coordinates inside a screen which configures a continuous region with a predetermined area, for each halftone level, and holds a collection of thresholds for the input gradation values which correspond to each of the output gradation values for each of the indexes and each of the halftone levels, a halftone level acquiring means (unit) which acquires any of a plurality of the halftone levels, a second storage means (unit) which is able to be read out at a higher speed than the first storage means (unit), a table setting means (unit) which retains the indexes which correspond to the acquired halftone levels in respective address regions, which correspond to screen coordinates which are different to each other, in the second storage means (unit) and retains the collection of thresholds for the input gradation values, which correspond to the acquired halftone levels, in the second storage means (unit), an input gradation value acquiring means (unit) which acquires the input gradation values for each of the pixels which configure print target image data, an index acquiring means (unit) which acquires the indexes, which correspond to the positions of the pixels where the input gradation values are acquired, from the second storage means (unit), and a gradation conversion means (unit) which converts the acquired input gradation values to the corresponding output gradation values based on the collection of thresholds for the input gradation values which correspond to the acquired indexes in the second storage means (unit), where the number of indexes is relatively high in a case which corresponds to low gradation levels which are halftone levels where the number of gradations in the corresponding output gradation values is relatively low.

According to the invention, it is possible to use the image processing apparatus for halftoning in both a case where a printing means (unit) is provided where output gradation values where the number of gradations is relatively low are input and in a case where a printing means (unit) is provided where output gradation values where the number of gradations is relatively high are input. In addition, according to the invention, since the number of gradation conversion patterns is relatively low, it is possible to optimize the dedicated circuit for halftoning for each type of device in a case where a printing means (unit) is provided where output gradation values where the number of gradations is relatively low are input and in a case where a printing means (unit) is provided where the number of gradation conversion patterns is relatively high and output gradation values where the number of gradations is relatively high are input. In detail, in a case where a printing means (unit) is provided where output gradation values where the number of gradations is relatively high are input, the number of thresholds for the input gradation values is relatively high for each of the indexes while the number of indexes is relatively low. Accordingly, in a case where a printing means (unit) is provided where output gradation values where the number of gradations is relatively high are input, it is possible to suppress the amount of increase as the total number of thresholds for the input gradation values to be less than the amount of increase in the number of thresholds for the input gradation values for each of the indexes. In addition, in a case where a printing means (unit) is provided where output gradation values where the number of gradations is relatively low are input, the number of thresholds for the input gradation values is relatively low for each of the indexes while the number of indexes is relatively high. Accordingly, it is possible to suppress the amount of increase as the total number of thresholds for the input gradation values to be less than the amount of increase in the number of indexes even in a case where a printing means (unit) is provided where output gradation values where the number of gradations is relatively low are input. As a result, it is possible to efficiently use the second storage means (unit) which holds the thresholds for the input gradation values for each type of device.

(2) For example, when applying conversion patterns of the gradation values which are different for each of the image classifications of the print target image data, such as images or text, it is possible to improve the printing quality while increasing the capacity of the second storage means (unit) (unit) for holding the thresholds for the input gradation values for each of the image classifications.

Therefore, the image processing apparatus for achieving the advantage described above can be further provided with a means (unit) which acquires image classifications of the print target image data, where the first storage means (unit) can hold a collection of the indexes for each of the image classifications and hold a collection of the thresholds for the input gradation values, which correspond to each of the output gradation values at the low gradation levels, for each of the indexes and each of the image classifications, the table setting means (unit) can retain a collection of the indexes and a collection of the thresholds for the input gradation values which correspond to the low gradation levels in address regions of the second storage means (unit) which are different for each of the image classifications in a case where the low gradation level is acquired as the halftone level, the index acquiring means (unit) can acquire the indexes, which correspond to the pixels where the input gradation values are acquired, from the address regions, which correspond to the acquired image classifications, in the second storage means (unit), and the gradation conversion means (unit) can convert the acquired input gradation values to the corresponding output gradation values based on the acquired indexes in the second storage means (unit) and a collection of the thresholds for the input gradation values which are retained in the address regions which correspond to the acquired image classifications, in a case where the low gradation level is acquired as the halftone level.

By adopting the configuration, in a case where a printing means (unit) is provided where output gradation values where the number of gradations is relatively low are input, the number of thresholds for the input gradation values is relatively low for each of the image classifications while it is possible to apply a gradation conversion pattern according to the image classification. Accordingly, it is possible to improve the image quality even in a case where a printing means (unit) is provided where output gradation values where the number of gradations is relatively low are input.

(3) In the image processing apparatus for achieving the advantage described above, the gradation conversion means (unit) can be provided with a first comparing unit which compares the respective collections of the thresholds for the input gradation values, which correspond to high gradation levels which are halftone levels where the number of output gradations is relatively high and the number of indexes is relatively low, with the input gradation values, a second comparing unit which compares the respective collections of the thresholds for the input gradation values, which correspond to the low gradation levels, with the input gradation values, and a selector which selects either of the output of the first comparing unit or the output of the second comparing unit according to the acquired halftone level.

(4) In the image processing apparatus for achieving the advantage described above, a table setting means (unit) can retain a collection of the thresholds for the input gradation values which correspond to the acquired halftone levels in address regions which respectively correspond to the indexes which are different to each other in the second storage means (unit), and the gradation conversion means (unit) can convert the acquired input gradation values to the corresponding output gradation values based on a collection of the thresholds for the input gradation values which are retained in the address regions which correspond to the acquired indexes in the second storage means (unit).

Here, the functions of each of the means (unit) which are described in the claims are realized by hardware resources where the functions are specified by the configuration itself, hardware resources where the functions are specified by a program, or by a combination of these. In addition, the functions of each of the means (unit) are not limited to being realized by hardware resources which are physically independent of each other. Furthermore, the invention is related to a method, an invention of a computer program, and a recording medium for a computer program. Of course, the recording medium for a computer program can be a magnetic recording medium, a magneto-optical recording medium, or any recording medium which is developed in the future.

BRIEF DESCRIPTION OF THE DRAWINGS

Referring now to the attached drawings which form a part of this original disclosure.

DETAILED DESCRIPTION OF EXEMPLARY EMBODIMENTS

Below, embodiments of the invention will be described in the following order with reference to the accompanying diagrams. Here, the same reference numerals are given to corresponding constituent components in each of the diagrams and duplicate description is omitted.

1. Overview of Image Processing Apparatus

Figure 1:
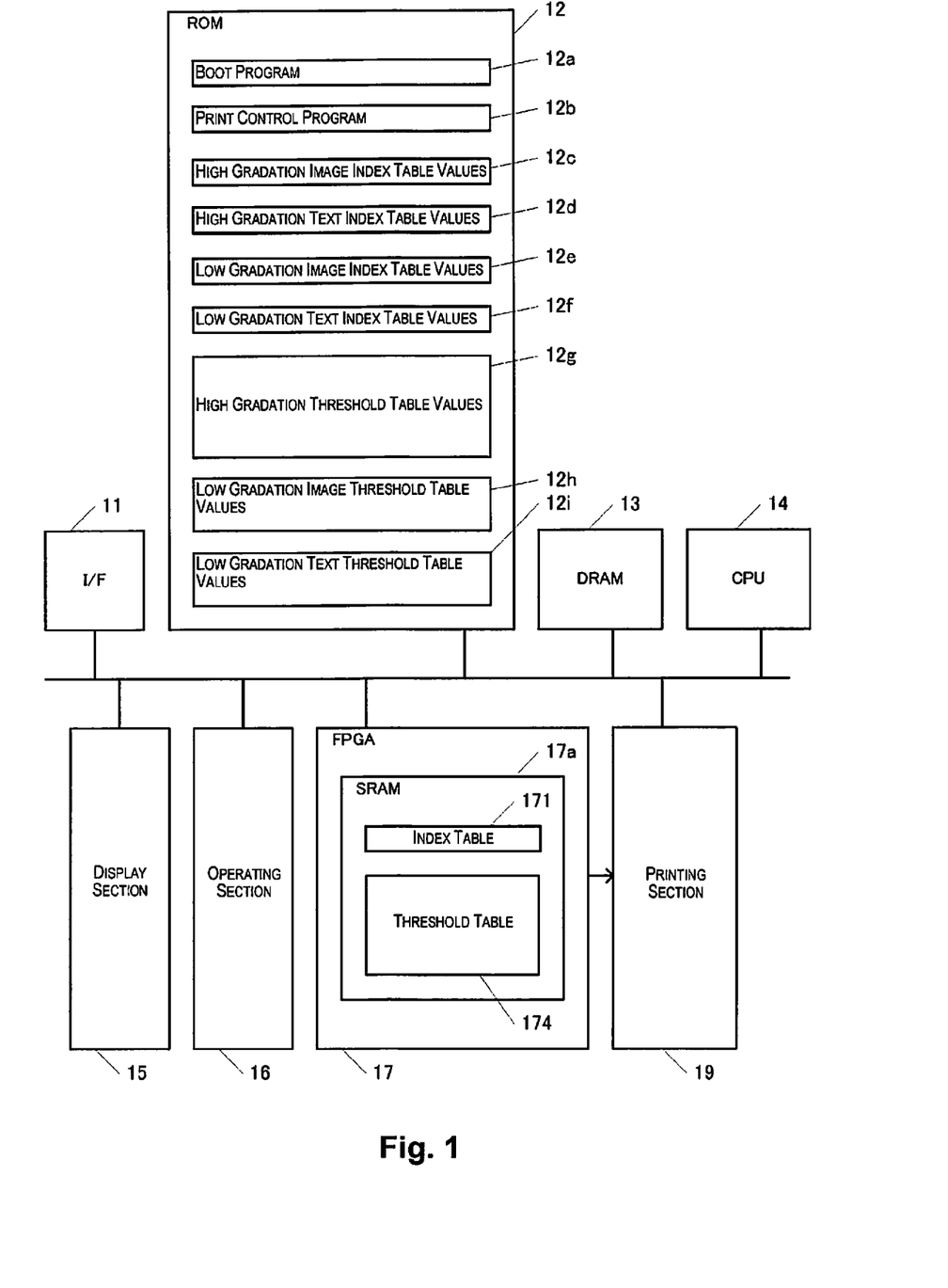
FIG. 1 is a block diagram of an embodiment of the invention.

FIG. 1 illustrates a configuration of an image processing apparatus 1 as an example of the invention. The image processing apparatus 1 is a printer which is provided with a laser printing section 19.

An interface 11 acquires print target image data by communicating with an information terminal such as a PC (Personal Computer) through a LAN or the like which is not shown in the diagram and retains the print target image data in a DRAM (Dynamic Random Access Memory) 13.

In addition to an OS (operating system) which is not shown in the diagram and a print control program 12b, an initial setting program 12a for setting up a halftoning processing section 17 which will be described later and various types of data are retained in a ROM 12 which is the first storage means (unit). The data for setting up the halftoning processing section 17 includes high gradation image index table values 12c, high gradation text index table values 12d, low gradation image index table values 12e, low gradation text index table values 12f, high gradation threshold table values 12g, low gradation image threshold table values 12h, and low gradation text threshold table values 12i. The details of the table values will be described later.

A CPU (Central Processing Unit) 14 functions as a print control means (unit) by executing the print control program 12b and functions as the halftone level acquiring means (unit) and the table setting means (unit) by executing the initial setting program 12a. An operation section 16 is provided with various types of keys for inputting instructions from a user when the CPU 14 functions as the halftone level acquiring means (unit), the table setting means (unit), and the print control means (unit). A display unit 15 is provided with an FDP (Flat Display Panel) for displaying a UI when the CPU 14 functions as the initial setting means (unit) and the print control means (unit).

The halftoning processing section 17 which is the input gradation value acquiring means (unit), the index acquiring means (unit), and the gradation conversion means (unit) is an ASIC (Application Specific Integrated Circuit) which includes an SRAM (Static Random Access Memory) 17a which is the second storage means (unit). The SRAM 17a includes an index table 171 which is an address region where the high gradation image index table values 12c and the high gradation text index table values 12d, or the low gradation image index table values 12e and the low gradation text index table values 12f are retained, and a threshold table 174 which is an address region where the high gradation threshold table values 12g or the low gradation image threshold table values 12h and the low gradation text threshold table values 12i are retained. The halftoning processing section 17 acquires the input gradation values and the coordinates (the position) for each of the pixels from the print target image data which is retained in the DRAM 13 and converts the acquired input gradation values to output gradation values using the index table 171 and the threshold table 174 and outputs the output gradation values.

The printing section 19 forms an electrostatic latent image on a photosensitive body with the output gradation values which are output from the halftoning processing section 17 as input by irradiating the photosensitive body with a laser with a pulse width which corresponds to the output gradation values. In addition, the printing section 19 forms an image by attaching toner to the electrostatic latent image on the photosensitive body and transferring the toner which is attached to the photosensitive body onto a print medium. In the image processing apparatus 1, it is possible to configure the printing section 19 with any of a plurality of types of printing units where the numbers of steps (the number of gradations in the output gradation values) in the pulse widths of the laser are different to each other. In the present embodiment, either a low gradation printing unit where the number of steps in the pulse widths of the laser is 16 or a high gradation printing unit where the number of steps in the pulse widths of the laser is 64 is mounted.

2. Overview of Halftoning Section

Figure 2:
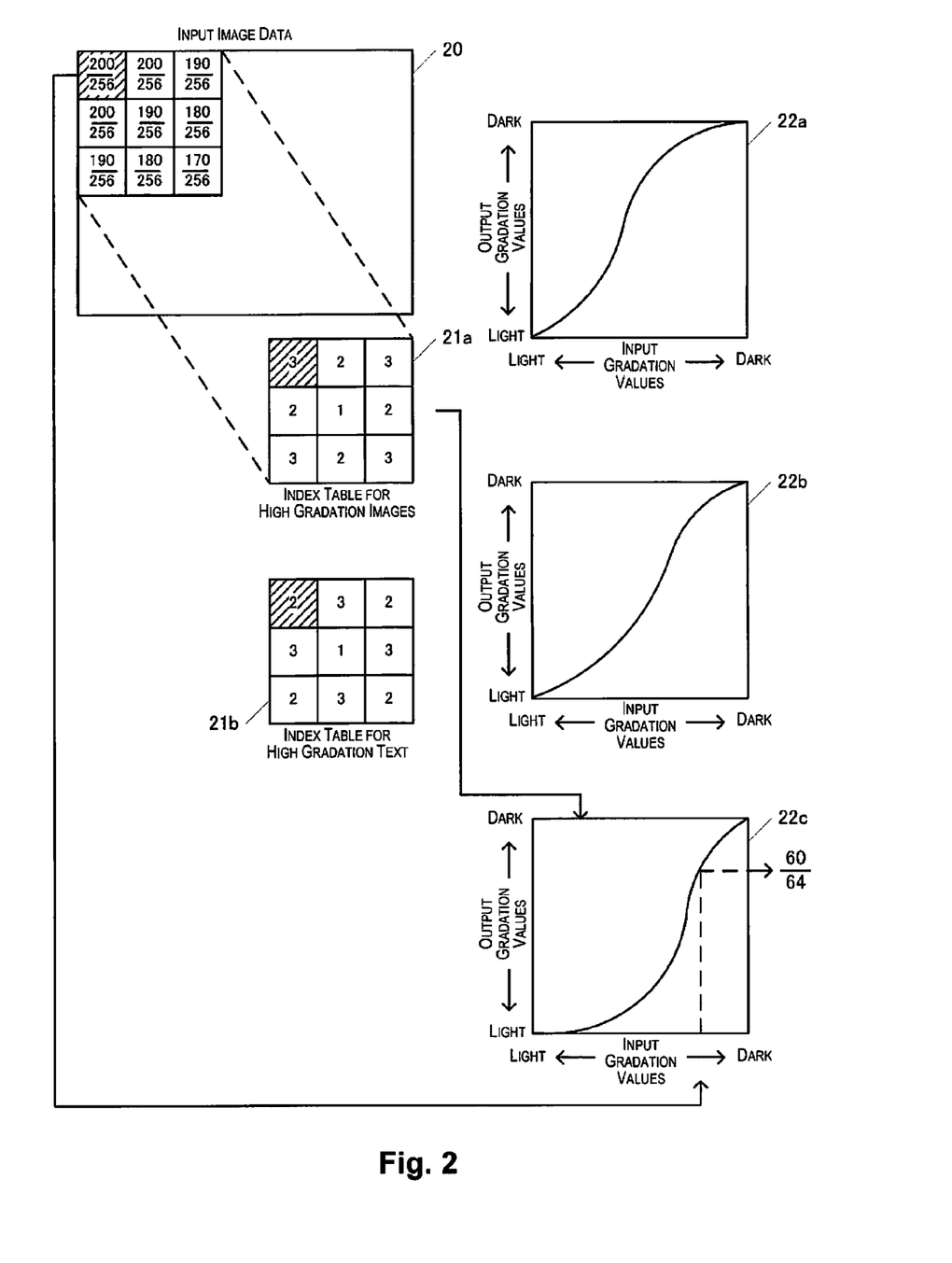
FIG. 2 is a schematic diagram of an embodiment of the invention.
Figure 3:
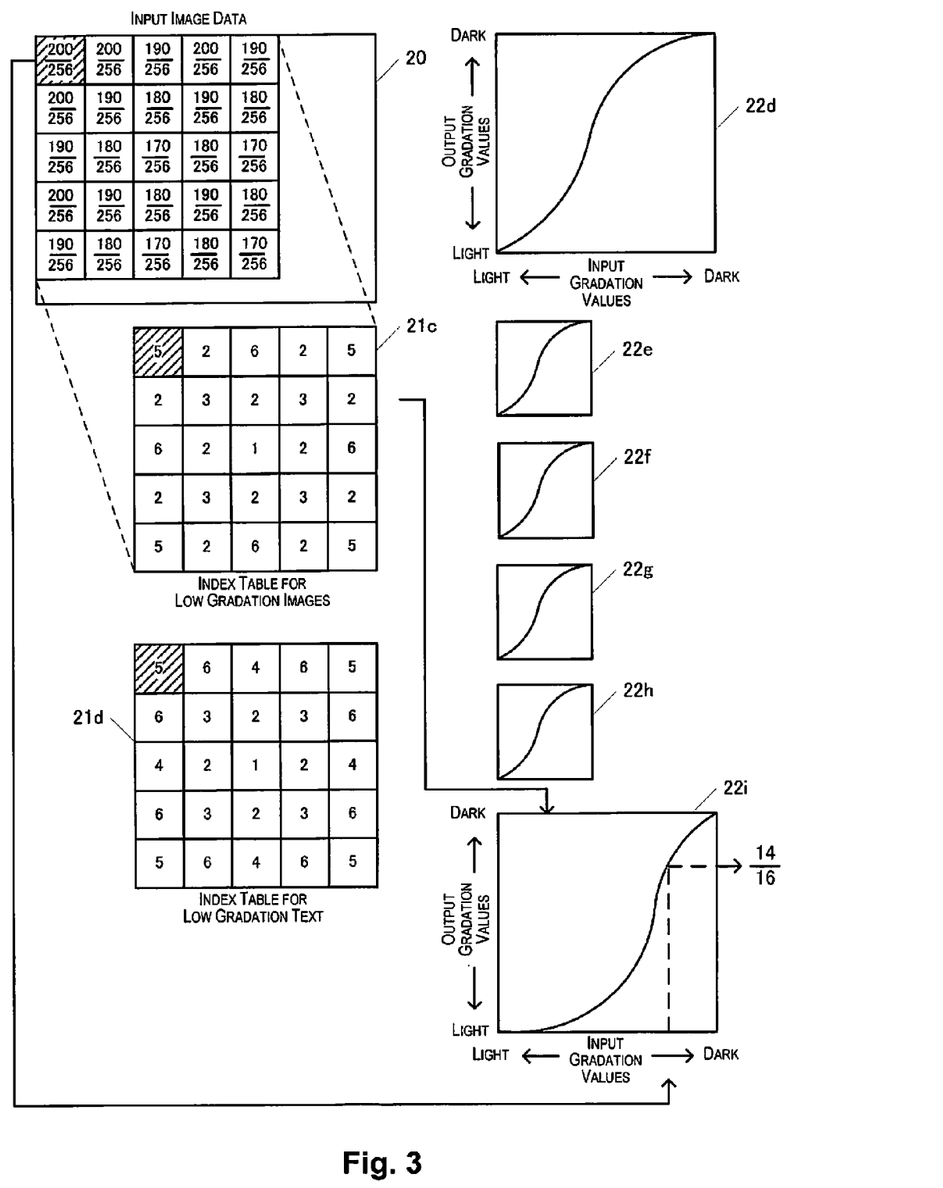
FIG. 3 is a schematic diagram of an embodiment of the invention.
Figure 4:
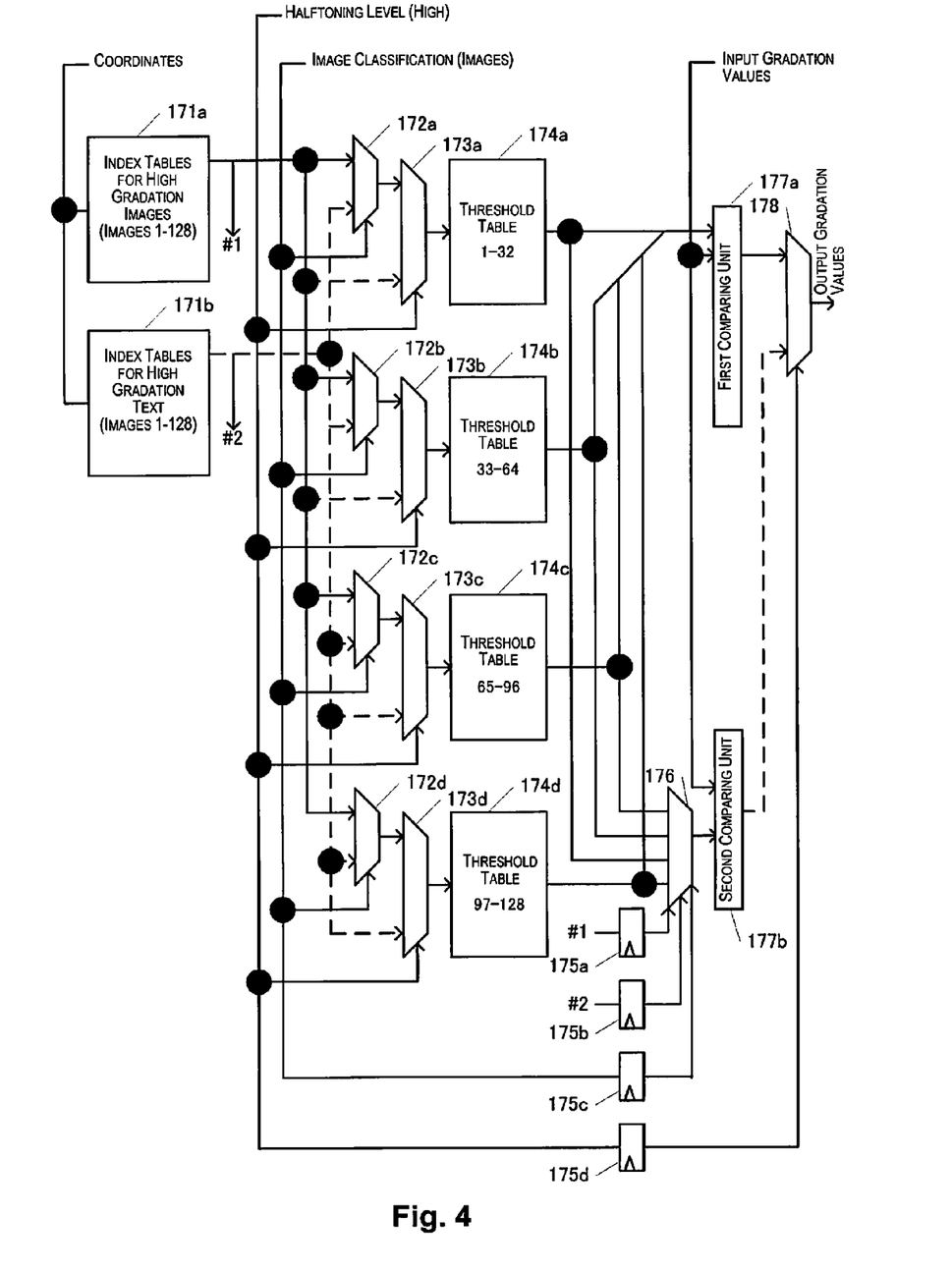
FIG. 4 is a block diagram of an embodiment of the invention.

The halftoning processing section 17 operates in a mode according to the halftone level. FIG. 2 is a schematic diagram for describing an operational overview of the halftoning processing section 17 in a case where the high gradation printing unit where the number of steps in the pulse widths of the laser is 64 is mounted as the printing section 19. FIG. 3 is a schematic diagram for describing an operational overview of the halftoning processing section 17 in a case where the low gradation printing unit where the number of steps in the pulse widths of the laser is 16 is mounted as the printing section 19. In FIG. 2 and FIG. 3, the screen sizes (which will be described later) of index tables 21a, 21b, 21c, and 21d, and the number of threshold tables 22a, 22b, 22c, 22d, 22e, 22f, 22g, 22h, and 22i which correspond to indexes which are different to each other are shown to be smaller than the screen sizes and number of threshold tables which are handled in the halftoning processing section 17, but the operational overview of the halftoning processing section 17 is described here using the screen sizes of the index tables and the number of threshold tables which are shown in FIG. 2 and FIG. 3 in order to facilitate understanding.

The index tables 21a, 21b, 21c, and 21d are data tables which hold the indexes which express the corresponding gradation conversion patterns in different address regions for each of the coordinates (the screen coordinates) which configure the screen which is the continuous region with a predetermined area. That is, the index tables hold the indexes which correspond to the screen coordinates in the address regions which correspond to the specific screen coordinates. The gradation conversion patterns are specified by the threshold tables 22a, 22b, 22c, 22d, 22e, 22f, 22g, 22h, and 22i where the thresholds for the corresponding input gradation values are determined for each of the output gradation values. Here, the actual forms of the indexes "1" to "6" are the addresses which show the address regions of the SRAM 17a as the threshold tables 22a, 22b, 22c, 22d, 22e, 22f, 22g, 22h, and 22i, but can be identifiers which are able to specify the addresses.

A high gradation image index table 21a and a high gradation text index table 21b shown in FIG. 2 hold one, two, or three indexes for each of nine screen coordinates which configure a 3×3 continuous region. A low gradation image index table 21c and a low gradation text index table 21d shown in FIG. 3 hold one, two, three, four, five, or six indexes for each of 25 screen coordinates which configure a 5×5 continuous region. In the image index tables 21a and 21c, indexes (that is, gradation conversion patterns which are determined using the threshold tables) are determined for each of the screen coordinates so as to suppress a decrease in image quality due to jumps in gradation. In addition, in the text index tables 21b and 21d, indexes (that is, gradation conversion patterns which are determined using the threshold tables) are determined for each of the screen coordinates so as to suppress a decrease in image quality due to the blurring of contours.

Here, the number of screen coordinates which correspond to the index tables, that is, the area of the continuous region which corresponds to the index table is referred to as the screen size. The number of indexes which are held by the index tables is less than the screen size of the index table. Finer gradation expression is possible as the number of indexes (that is, the number of threshold tables which specify the gradation conversion patterns) and the screen size are increased, but it is possible to reduce the data size of the threshold table 174 by reducing the number of indexes to be less than the screen size. Then, as described in Japanese Unexamined Patent Application Publication No. 2002-369001 and the like, it is possible to express gradation which is substantially equivalent to a case of using the same number of indexes as the screen size even when the number of indexes is reduced to a certain extent to be less than the screen size. That is, the index tables are not necessary in a case where the gradations are converted using the same number of gradation conversion patterns as the screen size, but it is possible to suppress the capacity of the threshold tables which specify the gradation conversion patterns while maintaining the quality of the gradation expression by using the index tables. Then, since it is possible for the capacity of the index table 171 to be significantly smaller than the capacity of the threshold table 174, it is possible to suppress the storage capacity of the SRAM 17*a* which holds the index table 171 and the threshold table 174.

The threshold tables 22*a*, 22*b*, 22*c*, 22*d*, 22*e*, 22*f*, 22*g*, 22*h*, and 22*i* are data tables which hold the thresholds for the corresponding input gradation values for each of the output gradation values. That is, the gradation conversion patterns are determined using the thresholds for the input gradation values which are held in the threshold tables 22*a*, 22*b*, 22*c*, 22*d*, 22*e*, 22*f*, 22*g*, 22*h*, and 22*i*. The threshold tables hold a set (collection) of the thresholds for the input gradation values which correspond to the indexes in the address regions which indicate the specific indexes. The thresholds are respectively retained in the address regions which correspond to the output gradation values which are different to each other. By comparing the thresholds which are read out from each of the address regions and the input gradation values, it is possible to specify the output gradation values which correspond to the input gradation values.

In a state where the high gradation printing unit is mounted, it is possible for the high gradation threshold tables 22*a*, 22*b*, and 22*c* to be used in both a case where the image classification of the print target image data is an image and a case where the image classification is text. Since the number of gradations in the high gradation printing unit is 64, the high gradation threshold tables 22*a*, 22*b*, and 22*c* each have a value of 64 as the threshold for the input gradation values. When the input gradation values and the thresholds for the input gradation values are set to 8 bit words, address regions with 512 (64×8) bits are necessary in each of the high gradation threshold tables 22*a*, 22*b*, and 22*c*. Accordingly, the high gradation threshold tables 22*a*, 22*b*, and 22*c* take up a capacity of 1536 (512×3) bits in the SRAM 17*a*.

In a state where the low gradation printing unit is mounted, it is possible for the threshold tables 22*d*, 22*e*, 22*f*, 22*g*, 22*h*, and 22*i* for low gradation images to be used in a case where the image classification of the print target image data is an image. Since the number of gradations in the low gradation printing unit is 16, the threshold tables 22*d*, 22*e*, 22*f*, 22*g*, 22*h*, and 22*i* for low gradation images each have a value of 16 as the threshold for the input gradation values. When the input gradation values and the thresholds for the input gradation values are set to 8 bit words, address regions with 128 (16×8) bits are necessary in each of the threshold tables 22*d*, 22*e*, 22*f*, 22*g*, 22*h*, and 22*i* for low gradation images. Accordingly, the threshold tables 22*d*, 22*e*, 22*f*, 22*g*, 22*h*, and 22*i* for low gradation images take up a capacity of 768 (128×6) bits in the SRAM 17*a*.

Then, in a case where the image classification of the print target image data is text in a state where the low gradation printing unit is mounted, it is possible to use six threshold tables which are not shown in the diagram in the same manner as the threshold tables 22*d*, 22*e*, 22*f*, 22*g*, 22*h*, and 22*i* for low gradation images. Accordingly, when the threshold tables for images and the tables for text are combined, the threshold tables take up a capacity of 1536 (768×2) in the SRAM 17*a* in a state where the low gradation printing unit is mounted.

That is, the capacity which is taken up by the threshold tables in the SRAM 17*a* is the same at 1536 bits even in a state where the high gradation printing unit is mounted and in a state where the low gradation printing unit is mounted.

As described above using simplified tables, a decrease in the gradation expression quality due to a low number of output gradations is suppressed in the present embodiment by having a relatively high number of indexes which correspond to the low gradation levels which are halftone levels where the number of gradations (that is, the number of thresholds for the input gradation values) of the corresponding number of output gradations is relatively low. Then, an increase in the capacity of the threshold table 174 due a high number of output gradations is suppressed by having a relatively low number of indexes which correspond to the high gradation levels which are halftone levels where the number of gradations (that is, the number of thresholds for the input gradation values) of the corresponding output gradation values is relatively high. Furthermore, at the low gradation level where the capacity of the individual threshold tables is low, the gradation expression quality in a mounting state where the number of gradations which are output is low is increased by preparing the threshold tables for each of the image classifications. Then, the use efficiency of the SRAM 17*a* is maximized by matching the capacities of threshold tables which are necessary in the case where the high gradation printing unit is mounted and the case where the low gradation printing unit is mounted. That is, in the present embodiment, by maximizing the use efficiency of the SRAM 17*a*, the halftoning processing section 17 which is a dedicated circuit for halftoning is optimized for each type of device while being shared between types of devices where the numbers of gradations in the output gradation values are different.

3. Configuration of Halftoning Processing Section

As shown in FIG. 4, FIG. 5, FIG. 6, and FIG. 7, the halftoning processing section 17 is provided with selectors 172, 173, 176, and 178, a comparing unit 177, a latch register 175, an output section which is not shown in the diagrams, and the like in addition to the SRAM 17*a* which holds the index table 171 and threshold table 174.

Figure 8:
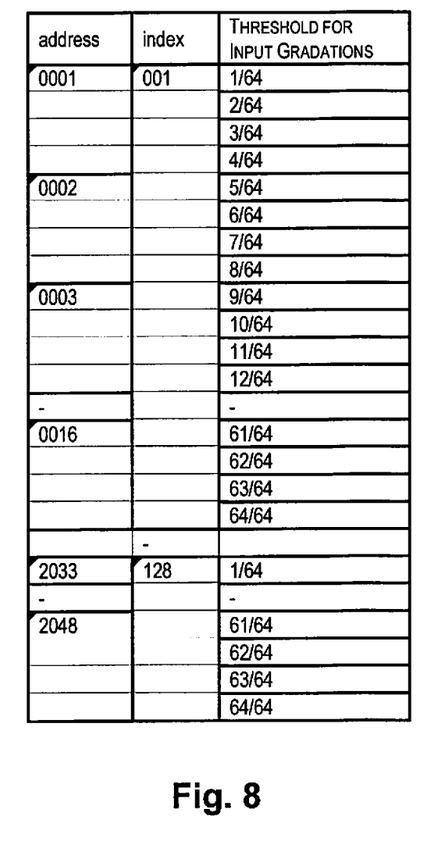
FIG. 8 is a data structure diagram of an embodiment of the invention.
Figure 9:
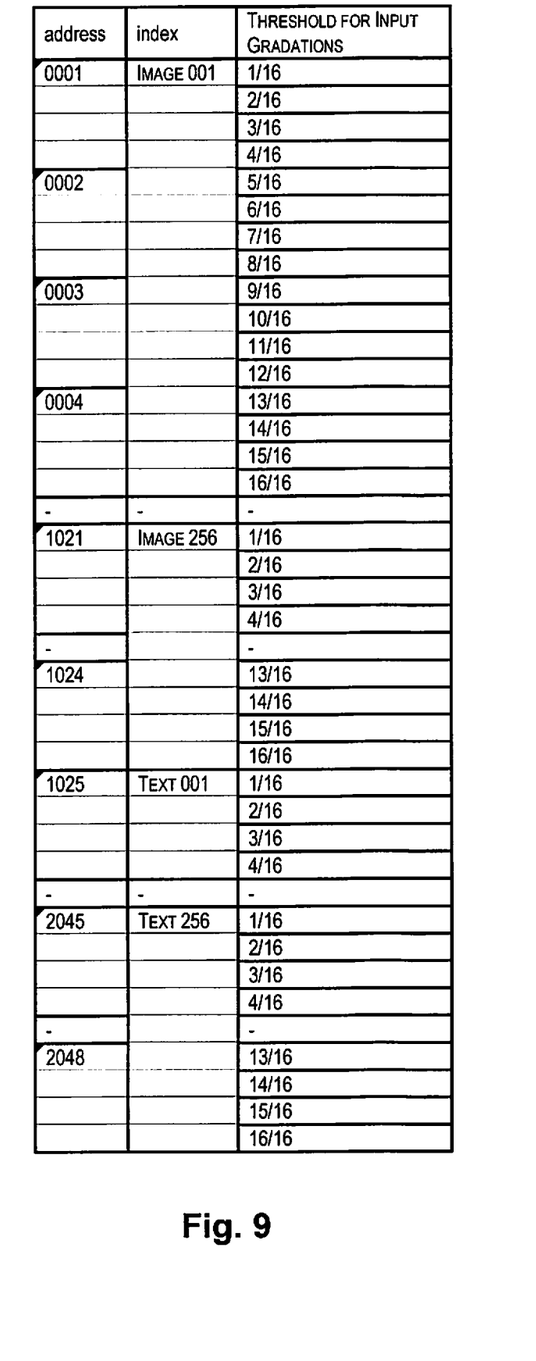
FIG. 9 is a data structure diagram of an embodiment of the invention.

FIG. 8 illustrates the structure of the high gradations threshold table which is divided into four parts and held by the SRAM 17*a* in a case where the high gradation printing unit is mounted as the printing section 19. FIG. 9 is a low gradations threshold table which is divided into four parts and held by the SRAM 17*a* in a case where the low gradation printing unit is mounted as the printing section 19. Since the number of gradations in the input gradation values in the present embodiment is 256 regardless of the halftone levels, the thresholds for the input gradation values are expressed with 8 bits in the high gradation threshold tables and the low gradations threshold tables. Since the SRAM 17*a* reads out data with 32 bits as one word, the threshold tables hold the thresholds of four of the input gradation values for each of the addresses.

The high gradations threshold tables shown in FIG. 8 hold the thresholds for the input gradation values which are in 64 steps for each of 128 indexes (each of the gradation conversion patterns). In other words, in a case where the high gradation printing unit is mounted as the printing section 19, the SRAM 17a divides the 8,192 (=128×64) thresholds as the values of the high gradations threshold table between four address regions 174a, 174b, 174c, and 174d and holds the thresholds.

On the other hand, the low gradations threshold table shown in FIG. 9 holds the thresholds for the input gradation values which are in 16 steps for each of 256 indexes for both images and text. Accordingly, the SRAM 17a divides the 8,192 (=2×256×16) thresholds as the values of the low gradations threshold table between four address regions 174a, 174b, 174c, and 174d and holds the thresholds even in a case where the low gradation printing unit is mounted as the printing section 19. That is, the capacity of the SRAM 17a which is necessary in order to hold the threshold tables is the same at 65,536 (=8,192×8) bits for a case where the high gradation printing unit is mounted as the printing section 19 and for a case where the low gradation printing unit is mounted as the printing section 19.

In the high gradations threshold tables, the thresholds for each of the gradations of the 64 output gradation values described above are held in a set where the indexes number 128. In addition, in the low gradations threshold tables, the thresholds for the images and the thresholds for the text for each of the gradations of the 16 output gradation values are each held in a set where the indexes number 256, sets with a total number of 512 indexes. Then, the threshold tables where the structures are different are retained across four address regions 174a, 174b, 174c, and 174d of the SRAM 17a. Accordingly, it is necessary to switch the address regions of the SRAM 17a which are to read out the sets of the thresholds for the input gradation values according to the halftone levels.

The selectors 173a, 173b, 173c, and 173d fulfil the switching function. Then, whether the thresholds which are read out from any of the address regions 174a, 174b, 174c, and 174d are input to the second comparing unit 177b is switched by the selector 176 according to the high-order bits of the addresses as the indexes since the SRAM 17a reads out the thresholds for the input gradation values of each of the sets from the four address regions 174a, 174b, 174c, and 174d but it is not possible for the second comparing unit 177b to compare the thresholds for the input gradation values of four sets with the input gradation values at one time. Then, since the thresholds for the input gradation values are output from both of the first comparing unit 177a and the second comparing unit 177b in a case where the low gradation printing unit is mounted and in a case where the high gradation printing unit is mounted, which of the thresholds, which are output from either of the comparing units, is output to the output section is switched by the selector 178.

In this manner, since the operation of the selector is switched according to the structure of the threshold table 174 which is changed according to the halftone level, the initial setting program 12a sets the mode according to the halftone level in the halftoning processing section 17 as described later.

4. Operation of Initial Setting Program

Figure 10:
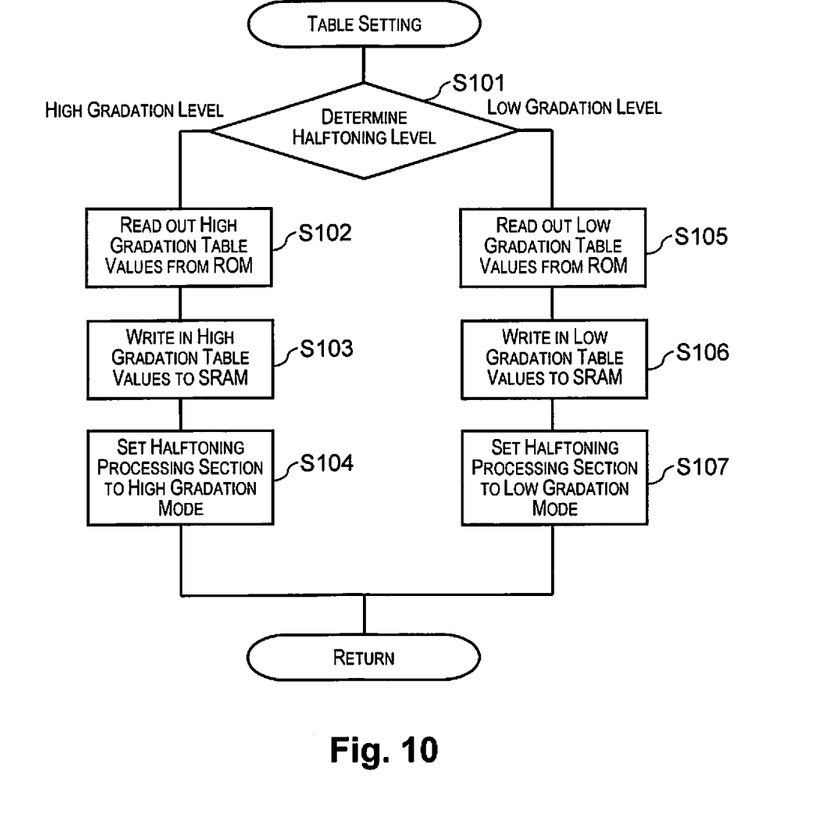
FIG. 10 is a flow chart of an embodiment of the invention.

FIG. 10 is a flow chart illustrating the flow of processes of the CPU 14 which functions as a table setting means (unit) by executing the initial setting program 12a. The initial setting program 12a starts when the image processing apparatus 1 is started and operates the CPU 14 as follows.

First, the CPU 14 determines the halftone level by acquiring the halftone level (S101). The halftone level can be acquired via the user interface, or the initial setting program 12a can acquire the halftone levels with the identifiers from either of the low gradation printing unit or the high gradation printing unit which is mounted as the printing section 19 as the values indicating the halftone levels.

In a case where the halftone level is a high gradation level, that is, in a case where the high gradation printing unit is mounted as the printing section 19, the CPU 14 reads the high gradation image index table values 12c, the high gradation text index table values 12d, and the high gradation threshold table values 12g from the ROM 12 into the DRAM 13 (S102).

Next, the CPU 14 retains the high gradation image index table values 12c in an address region 171a of the SRAM 17a and retains the high gradation text index table values 12d in an address region 171b of the SRAM 17a. Furthermore, the CPU 14 divides the high gradation threshold table values 12g into four and retains the values in the address regions 174a, 174b, 174c, and 174d of the SRAM 17a (S103).

Next, the CPU 14 sets the mode of the halftoning processing section 17 to the high gradation level (S104). As a result, as described above, the halftoning processing section 17 is set as a dedicated circuit which converts the input gradation values which are 8 bits to the output gradation values which are 6 bits using the index table 171, which holds the high gradation image index table values 12c and the high gradation text index table values 12d, and the threshold table 174 which holds the high gradation threshold table values 12g.

In a case where the halftone level is a low gradation level, that is, in a case where the low gradation printing unit is mounted as the printing section 19, the CPU 14 reads the low gradation image index table values 12e, the low gradation text index table values 12f, the low gradation image threshold table values 12h, and the low gradation text threshold table values 12i from the ROM 12 into the DRAM 13 (S105).

Next, the CPU 14 retains the low gradation image index table values 12e in the address region 171a of the SRAM 17a and retains the low gradation text index table values 12f in the address region 171b of the SRAM 17a. Furthermore, the CPU 14 divides in two and retains the low gradation image threshold table values 12h in the address regions 174a and 174b of the SRAM 17a and divides in two and retains the low gradation text threshold table values 12i in the address regions 174c and 174d of the SRAM 17a (S106).

Next, the CPU 14 sets the mode of the halftoning processing section 17 to the low gradation level (S107). As a result, as described above, the halftoning processing section 17 is set as a dedicated circuit which converts the input gradation values which are 8 bits to the output gradation values which are 4 bits using the index table 171, which holds the low gradation image index table values 12e and the low gradation text index table values 12f, and the threshold table 174, which holds the low gradation image threshold table values 12h and the low gradation text threshold table values 12i.

5. Operation When Executing Printing

Figure 5:
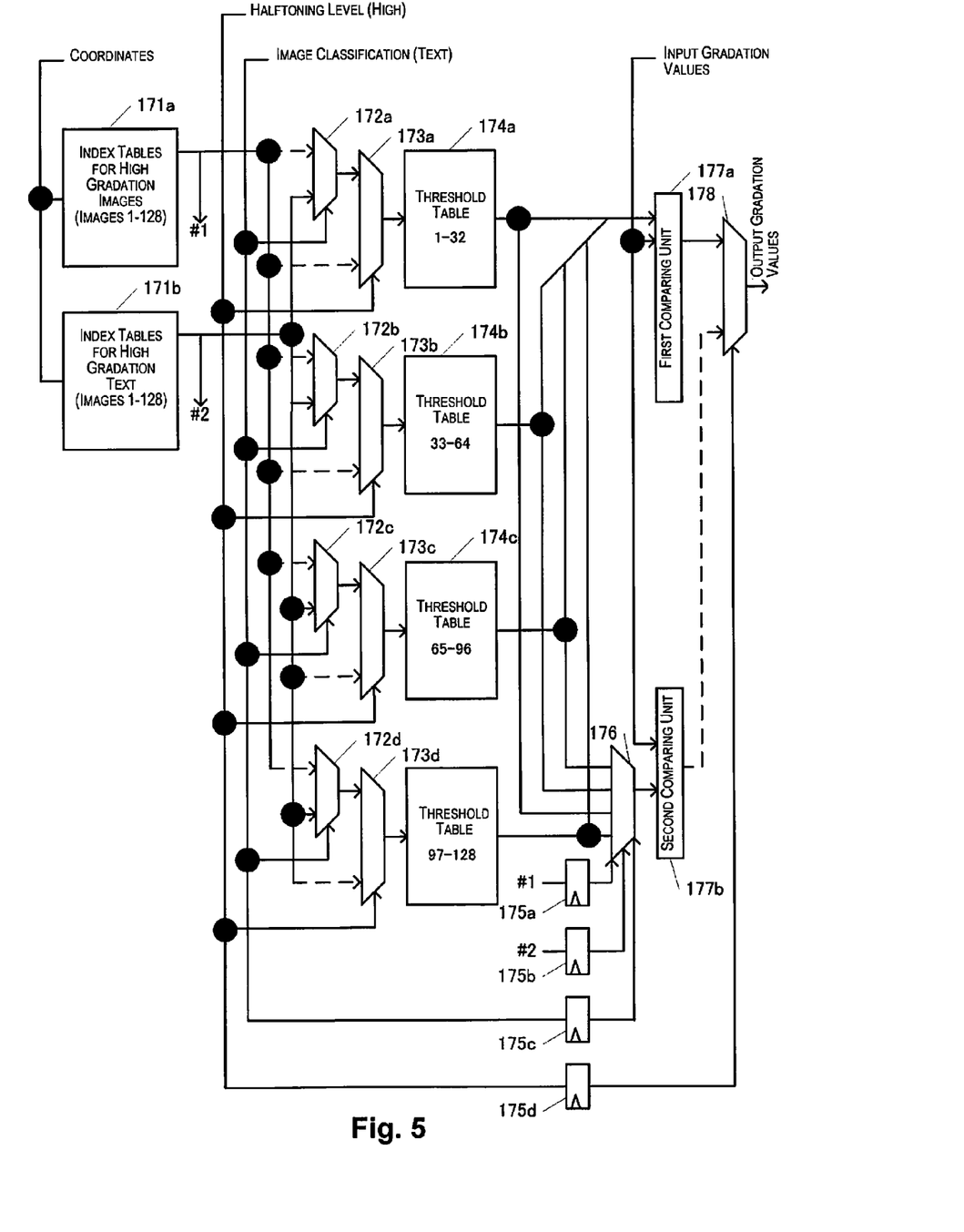
FIG. 5 is a block diagram of an embodiment of the invention.
Figure 6:
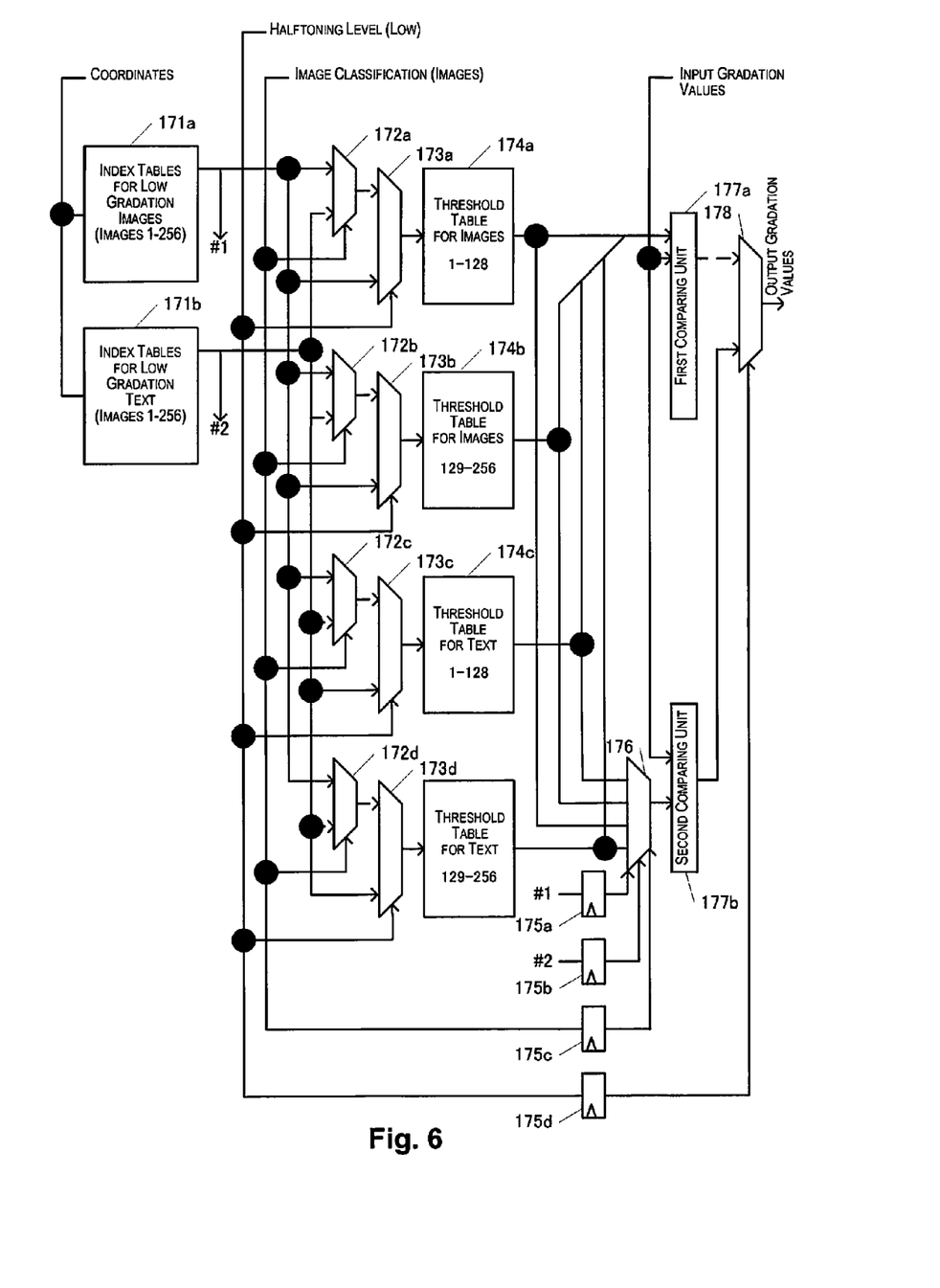
FIG. 6 is a block diagram of an embodiment of the invention.
Figure 7:
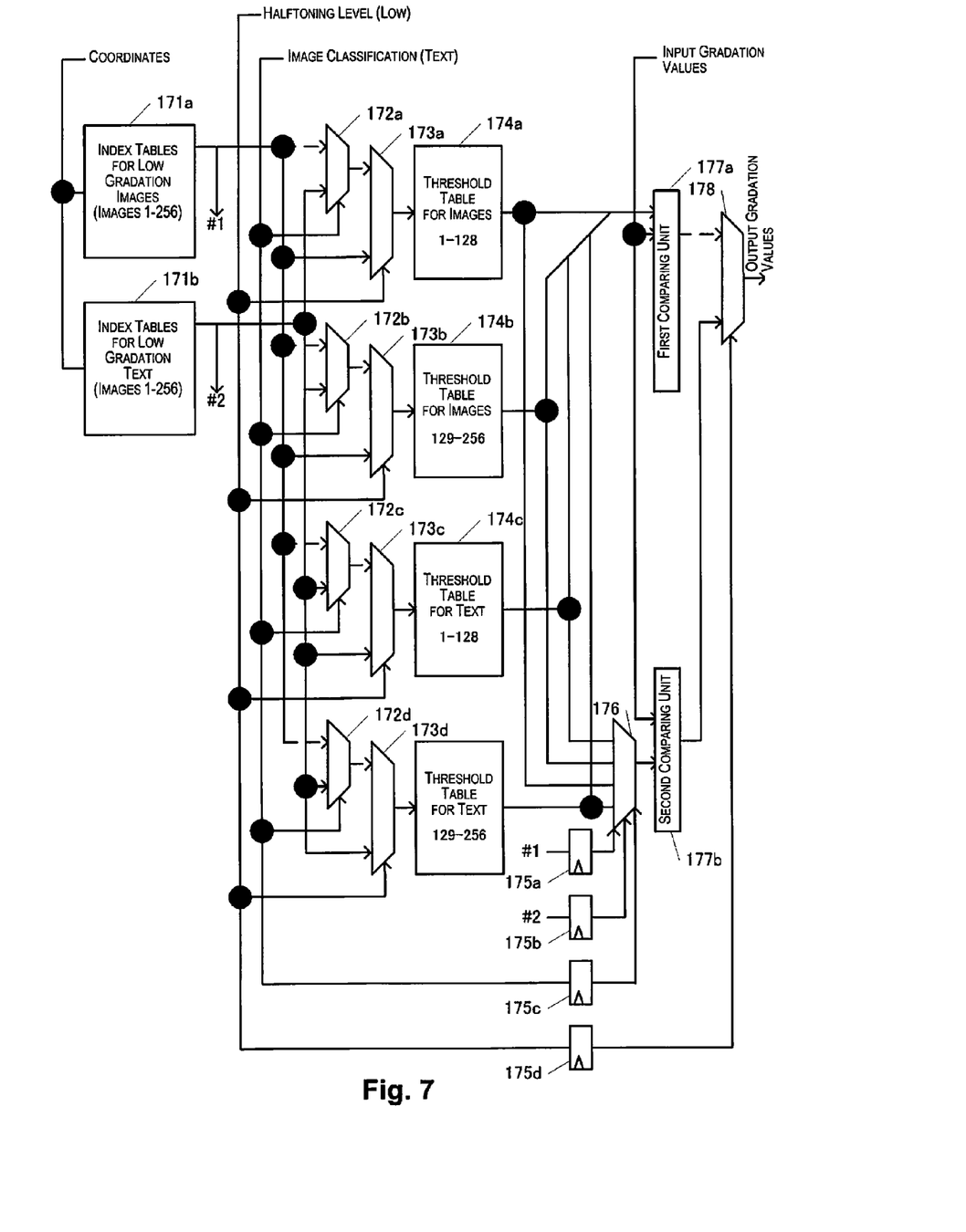
FIG. 7 is a block diagram of an embodiment of the invention.

Below, the operation of the image processing apparatus 1 when executing printing will be described based on FIG. 4, FIG. 5, FIG. 6, and FIG. 7. Here, in FIG. 4, when gradation conversion is carried out for the print target image data where the image classification is image in a state where the high gradation printing unit is mounted, the flow of data which is selected by each of the selectors is shown with solid lines and the flow of data which is not selected by each of the selectors is shown with broken lines. In FIG. 5, when gradation conversion is carried out for the print target image data where the image classification is text in a state where the high gradation printing unit is mounted, the flow of data which is selected by each of the selectors is shown with solid lines and the flow of data which is not selected by each of the selectors is shown with broken lines. In FIG. 6, when gradation conversion is carried out for the print target image data where the image classification is image in a state where the low gradation printing unit is mounted, the flow of data which is selected by each of the selectors is shown with solid lines and the flow of data which is not selected by each of the selectors is shown with broken lines. In FIG. 7, when gradation conversion is carried out for the print target image data where the image classification is text in a state where the low gradation printing unit is mounted, the flow of data which is selected by each of the selectors is shown with solid lines and the flow of data which is not selected by each of the selectors is shown with broken lines.

The CPU 14 which executes the print control program 12b outputs the image classification to the halftoning processing section 17 each time the print target image data is acquired. That is, in order to switch the index table and the threshold tables which are to be used between either image or text according to the classification of the print target image data, the print control program 12b determines the classification of the print target image data and outputs the image classification to the halftoning processing section 17 as the determination result.

The halftoning processing section 17 acquires the positions of the pixels of interest and the gradation values (the input gradation values) from the print target image data when executing printing, acquires the image or the text as the image classification from the print control program 12b, and carries out operations as follows.

Firstly, the halftoning processing section 17 specifies the high gradation image index table and the high gradation text index table which correspond to the position of the pixel of interest which is acquired, or the screen coordinates of the low gradation image index table and the low gradation text index table. In detail, each one of the addresses, which correspond to the screen coordinates in the two address regions 171a and 171b of the SRAM 171 where the high gradation image index table is retained, is derived by converting the coordinates which express the position of the pixel of interest. The SRAM 17a outputs the addresses as the indexes which correspond to the screen coordinates from the addresses which are specified. In the high gradation mode, one of the addresses is output for each of the tables as the index which is retained in the high gradation image index table and the high gradation text index table. In the low gradation mode, one of the addresses is output for each of the tables as the index which is retained in the low gradation image index table and the low gradation text index table. As a result, the addresses inside the address regions 174a, 174b, 174c, and 174d which correspond to the positions of the pixels of interest and the halftone level are specified.

The addresses as the indexes which are read out from the address regions 171a and 171b of the SRAM 17a are input to each of the selectors 172 and 173. In addition, the high-order bits of the address are input to the selector 176. Each selector 172 selects and outputs one of the two addresses, which are input, to each selector 173 according to the image classification. Each selector 173 selects one of the two addresses, which are input, according to the halftone level. As a result, one of the addresses of each of the four address regions 174a, 174b, 174c, and 174d which correspond to any of the position of the pixel of interest, the halftone level, or the image classification is specified.

The SRAM 17a reads out the thresholds for the input gradation values, which are retained in the address which are selected, one set at a time from the four address regions 174a, 174b, 174c, and 174d, and outputs the thresholds to the first comparing unit 177a and the selector 176.

The selector 176 selects one of any of the thresholds for the input gradation values which are read out from the address regions 174a, 174b, 174c, and 174d according to the high-order bits of the two addresses as the halftone level, the image classification, and the index. As a result, in the low gradation mode, one set of the thresholds for the input gradation values which is to be selected is input into the second comparing unit 177b as a set which corresponds to the position of the pixel of interest, the halftone level, and the image classification.

The first comparing unit 177a and the second comparing unit 177b each compare the input gradation values which are read in from the print target image data and the set of the thresholds for the input gradation values, specify the thresholds for the input gradation values which correspond to the input gradation values, and output the thresholds for the input gradation values, which correspond to the input gradation values which are specified, to the selector 178.

The selector 178 selects one which corresponds to the halftone level from out of the two thresholds for the input gradation values which are input from the first comparing unit 177a and the second comparing unit 177b. As a result, the threshold of the input gradation value is specified according to the position of the pixel of interest, the gradation value (the input gradation value) of the pixel of interest, the halftone level, and the image classification.

The output section which is not shown in the diagram converts to the output gradation values which are 6 bits and express the pulse width of the laser by truncating the lower 2 bits of the threshold (8 bits) of the input gradation values which are output from the selector 178 in a case where the halftone level is high gradation, adds 2 bits which control the rising position of the laser pulse, and outputs the result to the printing section 19. In addition, the output section converts to the output gradation values which are 4 bits and express the pulse width of the laser by truncating the lower 4 bits of the threshold (8 bits) of the input gradation values which are output from the selector 178 in a case where the halftone level is low gradation, adds 2 bits which control the rising position of the laser pulse and 2 bits which are redundant, and outputs the result to the printing section 19.

6. Other Embodiments

Here, the technical scope of the invention is not limited to the embodiments described above and it is obvious that it is possible to add various modifications within the scope which does not depart from the spirit of the invention. For example, description of adding processes, switching the order of execution of processes, and circuit components is omitted where such would be clear to a person skilled in the art.

The screen size of the index tables, the number of indexes, the number of image classifications, and the number of gradations in the input gradation values and the output gradation values which are shown in the embodiment described above are just examples. For example, in the low gradation level, the number of gradations in the output gradation values can be set to 32 and the threshold table can be shared for images and text. Also, in this case, the data size of the threshold table which is used in the low gradation level is 65,536 (=256×32× 8) bits. Here, by the capacity of the threshold table for each of the halftone levels being equal, it is possible to optimize use efficiency of the SRAM 17a, but the capacity of the threshold table can be different for each of the halftone levels. In order to for the capacity of the threshold tables for each of the halftone levels to be equal, the number of indexes and the number of gradations can be set such that the product of the sum of the indexes of all the image classifications and the number of output gradations is constant.

In addition, in the embodiment described above, the first comparing unit and the second comparing unit are provided in the halftoning processing section, but the first comparing unit can be omitted and number of words which are able to be compared at one time by the second comparing unit can be set to the same number as the first comparing unit which is omitted. In addition, in the embodiment described above, the threshold tables are divided into four and retained in four address regions of the SRAM 17a and the addresses are selected by providing two steps of selectors for each of the address regions, but the threshold tables can be divided into two and retained in two address regions of the SRAM 17a and the addresses can be selected by providing two steps of selectors for each of the address regions.

In addition, in the embodiment described above, a rectangular screen is exemplified, but the shape of the screen need not be a rectangle as long as it is a shape where it is possible to align screens with the same shape without gaps. In addition, in the embodiment described above, two types which are text and images are exemplified as image classifications, but the index tables and the threshold tables can be configured to regard the image classifications as one type, or the index tables and the threshold tables can be configured to regard the image classifications as three or more types.

In addition, in the embodiment described above, the ROM is exemplified as the first storage means (unit) and the SRAM is exemplified as the second storage means (unit), but any type of combination can be used as long as the combination of the storage media which are used as the first storage means (unit) and the second storage means (unit) are storage media where it is possible to more rapidly read out the second storage means (unit). For example, a hard disk drive apparatus can be used as the first storage means (unit) and a RAM can be used as the second storage means (unit).

What is claimed is:

1. An image processing apparatus, which converts input gradation values of printing target image data to output gradation values with a number of gradations which is able to form an image, comprising:
    a first storage unit which holds indexes, which indicate gradation conversion patterns which correspond to each of the coordinates inside a screen region which configures a continuous region with a predetermined area, for each halftone level which corresponds to the number of gradations in the output gradation values, and holds threshold information which is used for converting the input gradation values to the output gradation values to correspond to each of the indexes;
    a halftone level acquiring unit which acquires any of a plurality of the halftone levels;
    a second storage unit configured to be read out at a higher speed than the first storage unit;
    a setting unit which retains the indexes, which correspond to the halftone levels which are acquired by the halftone level acquiring unit, in the second storage unit and retains the threshold information, which corresponds to the acquired halftone levels, in the second storage unit;
    an input gradation value acquiring unit which acquires the input gradation values for each of the pixels which configure print target image data;
    an index acquiring unit which acquires the indexes which correspond to the positions inside the screen region from the second storage unit for the pixels where the input gradation value acquiring unit acquires the input gradation values; and
    a gradation conversion unit which converts the acquired input gradation values to the output gradation values based on the threshold information, which corresponds to the acquired indexes, in the second storage unit,
    wherein, in a case which corresponds to low gradation levels which are halftone levels where the number of gradations in the corresponding output gradation values is low, the number of values that the indexes can be, which are included inside the screen region, is larger than a case of high gradation levels which are halftone levels where the number of gradations in the corresponding output gradation values is higher than the low gradation levels.

2. The image processing apparatus according to claim 1, further comprising:
    a unit which acquires image classifications of the print target image data,
    wherein the first storage unit holds the indexes for each of the image classifications and holds threshold information for the input gradation values which correspond to each of the output gradation values at the low gradation levels,
    the setting unit retains the indexes and the threshold information for the input gradation values, which correspond to the low gradation levels, in address regions of the second storage unit which are different for each of the image classifications in a case where the low gradation level is acquired as the halftone level,
    the index acquiring unit acquires the indexes, which correspond to the pixels where the input gradation values are acquired, from the address regions, which correspond to the acquired image classifications, in the second storage unit, and
    the gradation conversion unit converts the acquired input gradation values to the corresponding output gradation values based on the acquired indexes in the second storage unit and the threshold information for the input gradation values which are retained in the address regions which correspond to the acquired image classifications, in a case where the low gradation level is acquired as the halftone level.

3. The image processing apparatus according to claim 1, wherein the gradation conversion unit is provided with a first comparing unit which compares the threshold information for the input gradation values, which correspond to the high gradation levels which are the halftone levels where the number of output gradations is relatively high and the number of the indexes is relatively low, with the input gradation values, a second comparing unit which compares the threshold information for the input gradation values, which correspond to the low gradation levels, with the input gradation values, and a selector which selects either of the output of the first comparing unit or the output of the second comparing unit according to the halftone level which is acquired by the halftone level acquiring unit.

4. The image processing apparatus according to claim 1, wherein the setting unit retains the threshold information for the input gradation values, which correspond to the halftone levels which are acquired by the halftone level acquiring unit, in address regions, which respectively correspond to the indexes which are different to each other, in the second storage unit, and the gradation conversion unit converts the acquired input gradation values to the corresponding output gradation values based on the threshold information for the input gradation values which are retained in the address regions, which correspond to the acquired indexes, in the second storage unit.

\* \* \* \* \*